(12) United States Patent
Wessels

(10) Patent No.: US 12,018,709 B2
(45) Date of Patent: Jun. 25, 2024

(54) T-NUT FOR A TOILET BOWL FLANGE BOLT

(71) Applicant: Jeffrey Len Wessels, Kentwood, MI (US)

(72) Inventor: Jeffrey Len Wessels, Kentwood, MI (US)

( * ) Notice: Subject to any disclaimer, the term of this patent is extended or adjusted under 35 U.S.C. 154(b) by 288 days.

(21) Appl. No.: 17/520,231

(22) Filed: Nov. 5, 2021

(65) Prior Publication Data

US 2022/0145926 A1 May 12, 2022

Related U.S. Application Data

(60) Provisional application No. 63/112,544, filed on Nov. 11, 2020.

(51) Int. Cl.
*F16B 37/14* (2006.01)
(52) U.S. Cl.
CPC .................................... *F16B 37/14* (2013.01)
(58) Field of Classification Search
CPC ......... F16B 37/14; F16B 37/16; F16B 41/005
USPC ... 411/372.5–372.6, 373, 429, 430–431, 435
See application file for complete search history.

(56) References Cited

U.S. PATENT DOCUMENTS

| | | | | |
|---|---|---|---|---|
| 1,254,514 | A * | 1/1918 | Lehmann | F16B 37/14 |
| | | | | 138/89.4 |
| 2,819,642 | A * | 1/1958 | Refrigeri | F16B 37/14 |
| | | | | 411/373 |
| 4,472,097 | A * | 9/1984 | Kiefer | F16B 37/14 |
| | | | | 411/429 |
| 4,557,654 | A * | 12/1985 | Masuda | F16B 37/14 |
| | | | | 411/431 |
| 4,600,344 | A | 7/1986 | Sutenbach | |
| 4,907,929 | A | 3/1990 | Johnston | |
| 6,698,986 | B2 * | 3/2004 | Fraleigh | F16B 35/06 |
| | | | | 411/301 |
| 7,490,366 | B1 | 2/2009 | Richter | |
| 8,333,537 | B2 * | 12/2012 | Rogers | F16B 37/14 |
| | | | | 301/35.622 |
| 10,941,805 | B2 * | 3/2021 | Schramm | F16B 37/16 |
| 2011/0123293 | A1 | 5/2011 | Matlock | |
| 2014/0053326 | A1 * | 2/2014 | Kennedy | E03D 11/16 |
| | | | | 4/252.1 |
| 2020/0109736 | A1 * | 4/2020 | Schramm | F16L 33/24 |
| 2021/0180638 | A1 * | 6/2021 | Schramm | F16L 33/24 |

FOREIGN PATENT DOCUMENTS

WO WO1985001090 A1 3/1985

* cited by examiner

*Primary Examiner* — Roberta S Delisle

(57) ABSTRACT

A T-nut for a toilet bowl flange bolt is an apparatus that fastens a bolt for a toilet bowl flange without additional tools. The apparatus includes a T-nut body and a wing nut. The T-nut body tightens the bolt with the toilet bowl flange. The wing nut secures the bolt with the T-nut and the toilet bowl flange. The T-nut includes a cavitated base, a handle, and a first threaded hole. The cavitated base engages the bolt through the first threaded hole. The handle allows a user to maneuver the cavitated base until the cavitated base securely presses against the toilet bowl flange. The wing nut includes a nut member, at least one wing member, and a second threaded hole. The nut member engages with the bolt through the second threaded hole as well, and the at least one wing member latches the nut member into the cavitated base.

9 Claims, 5 Drawing Sheets

T-NUT FOR A TOILET BOWL FLANGE BOLT

The current application claims a priority to the U.S. Provisional Patent application Ser. No. 63/112,544 filed on Nov. 11, 2020.

FIELD OF THE INVENTION

The present invention generally relates to toilet bowl equipment. More specifically, the present invention is a T-nut for a toilet bowl flange bolt.

BACKGROUND OF THE INVENTION

Nuts for holding toilets to toilet flanges exist in the industry. Typically, a flange assembly would have a flange bolt and a corresponding nut. The flange bolt holds the flange and the toilet together, and the mating nut locks the flange and the toilet by fastening to secure the assembly. Some downsides of this procedure are that it requires tools such as a ranch to fasten the flange assembly. Also, in many cases the bolt and the nut are not resistant to water so that the bolt and the nut eventually get oxidized and structurally fail.

An objective of the present invention is to provide a novel T-nut structure that has a wing nut embedded inside to fasten the toilet flange assembly. Another objective is to provide a nut structure that is resistant to water to prevent the oxidization and increase its durability. The nut of the present invention, also referred to as the "Easy Nut," allows a user to install the toilet flange assembly without any tools. The easy nut secures the toilet flange assembly for long periods without oxidizing by using plastic materials and a rubber ring to seal the connection. Additional features and benefits are further discussed in the sections below.

DETAILED DESCRIPTIONS OF THE INVENTION

Figure 1:
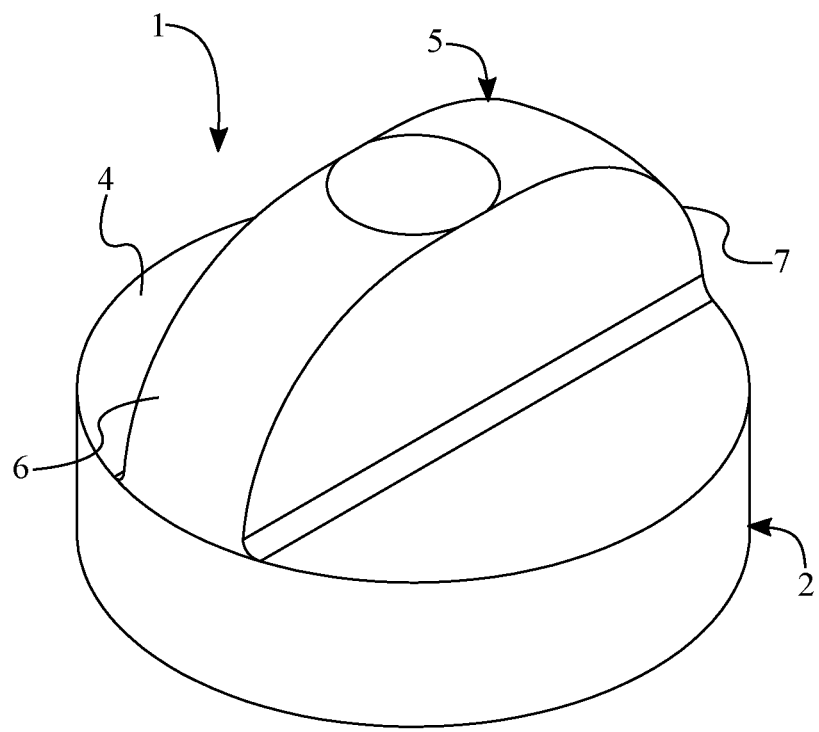
FIG. 1 is a top perspective view of the present invention.

All illustrations of the drawings are for the purpose of describing selected versions of the present invention and are not intended to limit the scope of the present invention.

The present invention is a T-nut for a toilet bowl flange bolt. The present invention secures the bolt of a toilet bowl flange without the use of additional tools during installation. The present invention effectively fastens a bolt and effectively conceals and covers the bolt as well throughout use of the toilet bowl. In order to tighten the bolt with the toilet bowl flange, the present invention comprises a T-nut body 1 and a wing nut 13, seen in FIG. 1 and FIG. 3. The T-nut body 1 engages the bolt of a toilet bowl flange and provides a maneuverable grip for a user. The T-nut body 1 also serves as a cap for the bolt of a toilet bowl flange. The wing nut 13 further secures the attachment between the T-nut body 1 and the bolt. In the preferred embodiment of the present invention, the T-nut body 1 is made of plastic material, and the wing nut 13 is made of plastic material in order to eliminate or significantly reduce oxidation over time. Furthermore, the present invention therefore does not rust the bolt and ensures the connection between the bolt and the toilet bowl flange for an extended period of time. In order for the T-nut body 1 to surround the bolt of a toilet bowl flange, the T-nut body 1 comprises a cavitated base 2, a handle 5, and a first threaded hole 8, seen in FIG. 1, FIG. 2, and FIG. 3. The cavitated base 2 houses the wing nut 13 and engages the bolt through the first threaded hole 8. The handle 5 allows a user to easily grip and rotate the cavitated base 2 around the bolt until the cavitated base 2 securely presses against the toilet bowl flange and the bolt is securely positioned within the first threaded hole 8. The first threaded hole 8 receives the bolt and allows the bolt to be latched into the cavitated base 2 while preserving the structural integrity of the cavitated base 2. The cavitated base 2 comprises a proximal planar surface 3 and a distal planar surface 4. The proximal planar surface 3 presses against the toilet bowl flange. More specifically, the proximal planar surface 3 presses against the exterior of the base of a toilet bowl, and consequently presses against the toilet bowl flange that is positioned beneath the base of the toilet bowl. The distal planar surface 4 is oriented towards the surrounding environment of the present invention and upholds the handle 5. In order for the wing nut 13 to secure the connection between the T-nut body 1 and the bolt, the wing nut 13 comprises a nut member 14, at least one wing member 15, and a second threaded hole 16. The nut member 14 engages with the bolt, and in the preferred embodiment of the present invention, the A transversal cross section of the nut member 14 is a hexagonal shape. The at least one wing member 15 latches the nut member 14 within the cavitated base 2. In the preferred embodiment of the present invention, the at least one wing member 15 is three wing members and is shaped as a rectangular prism.

Figure 2:
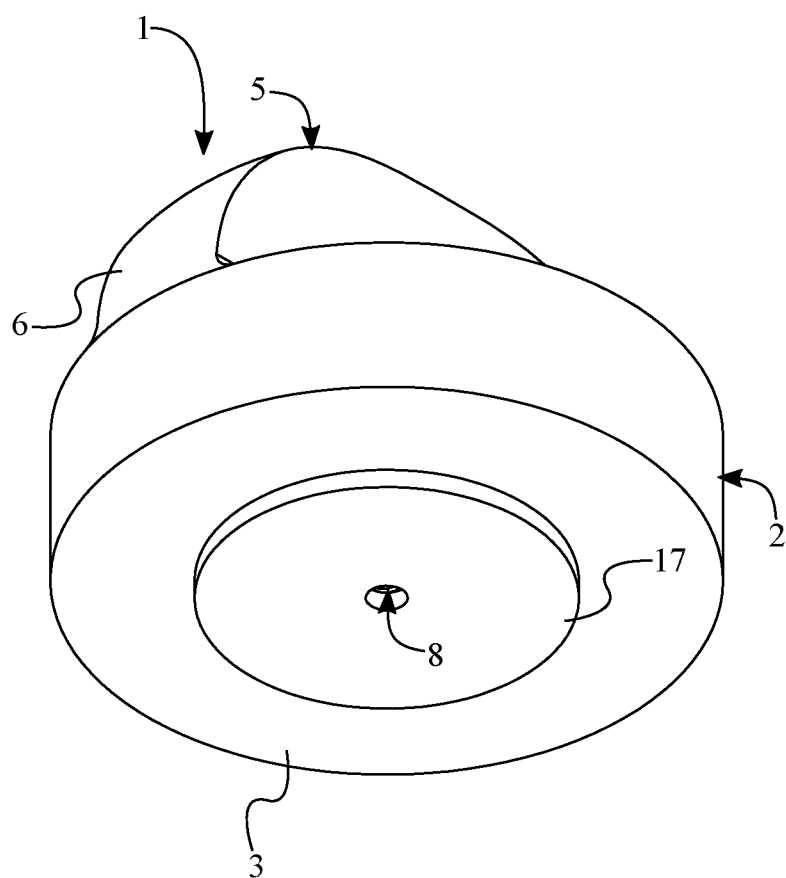
FIG. 2 is a bottom perspective view of the present invention with a rubber ring.

The overall configuration of the aforementioned components allows both the T-nut body 1 and the wing nut 13 to fasten a toilet bowl flange bolt without any additional tools. The proximal planar surface 3 is positioned opposite the distal planar surface 4 about the cavitated base 2, thereby defining a thickness for the cavitated base 2, as seen in FIG. 1 and FIG. 2. As the distal planar surface 4 is oriented away from the base of a toilet bowl, and consequently the toilet bowl flange, the handle 5 is positioned adjacent with the distal planar surface 4 and is fixed onto the distal planar surface 4. This arrangement facilitates the rotation of the present invention with the handle 5 by a user. In order to secure the position of the nut member 14 within the cavitated base 2, the at least one wing member 15 is laterally fixed with the nut member 14. The second threaded hole 16 traverses through the nut member 14 so that the bolt may traverse through the nut member 14 and engage with the nut member 14 while preserving the structural integrity of the nut member 14. In order for the nut member 14 to be latched within the cavitated base 2 as the nut member 14 engages with the bolt, the wing nut 13 is mounted within the cavitated base 2. In order for the cavitated base 2 to engage with the bolt, the first threaded hole 8 traverses from proximal planar surface 3 into the cavitated base 2, seen in FIG. 3. This arrangement also allows the present invention to cover the bolt and serve as a cap for the bolt. In alternate embodiments of the present invention, the first threaded hole 8 further traverses through the cavitated base 2 and into the handle 5, as seen in FIG. 4, in order to accommodate longer lengths of various bolts. The second threaded hole 16 is concentrically positioned with the first threaded hole 8 so that the bolt engages with both the T-nut body 1 and the wing nut 13 simultaneously and continuously.

Figure 3:
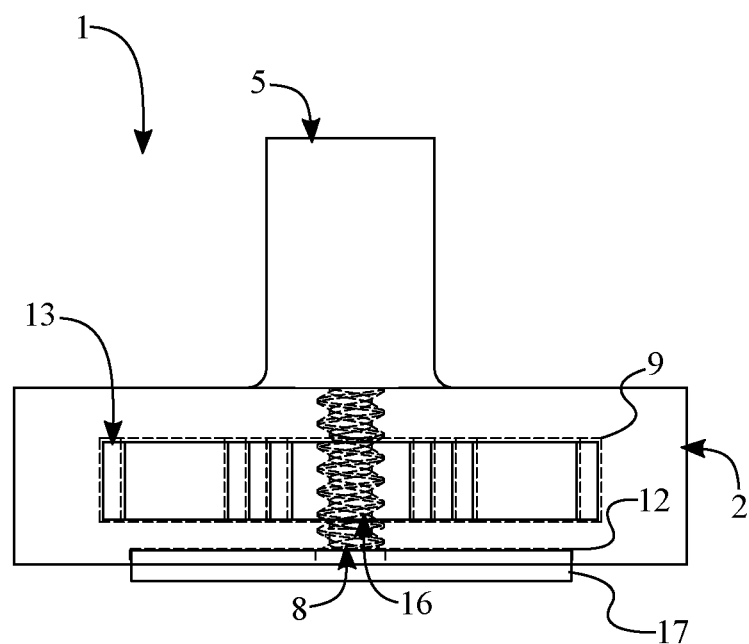
FIG. 3 is a side schematic view of the present invention with a first threaded hole extending into a cavitated base of a T-nut body.
Figure 4:
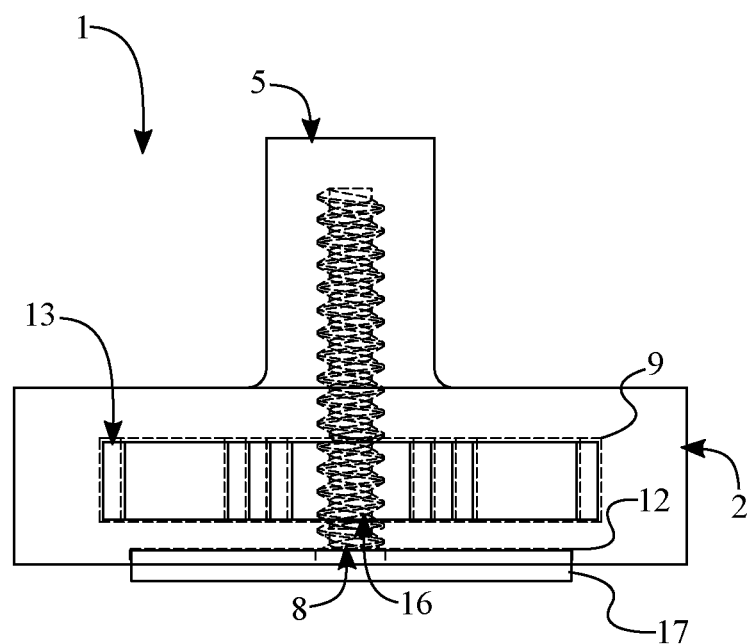
FIG. 4 is a side schematic view of the present invention with the first threaded hole extending into the cavitated base and into a handle of the T-nut body.
Figure 5:
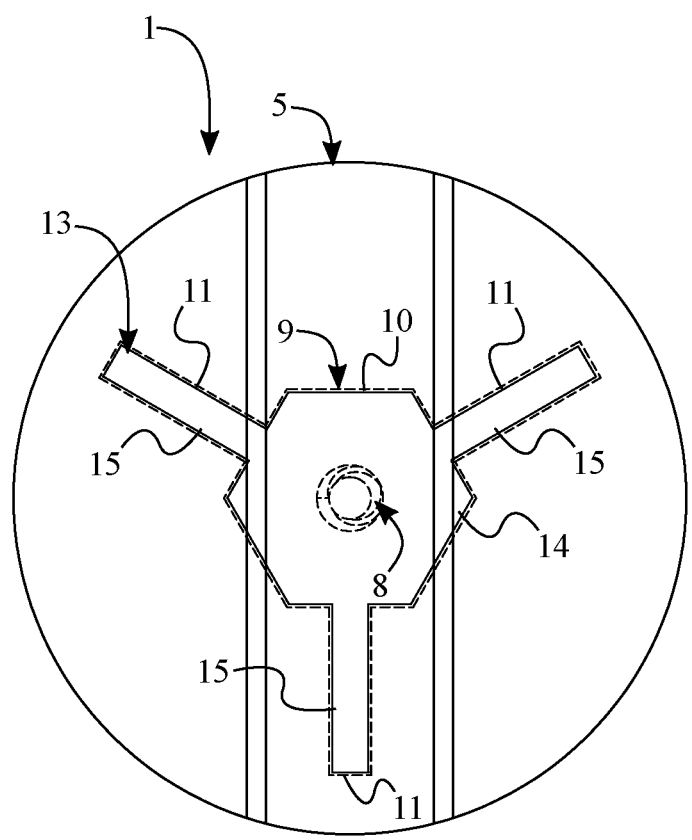
FIG. 5 is a top schematic view of the present invention with a wing nut positioned within a storage cavity of the T-nut body.

In order to further preserve the structural integrity of the T-nut body 1, the T-nut body 1 may further comprise a storage cavity 9, seen in FIG. 3, FIG. 4, and FIG. 5. The storage cavity 9 provides the necessary space for the wing nut 13 to be positioned within the cavitated base 2. The storage cavity 9 conforms to the overall structure of the wing nut 13 so that the wing nut 13 is maneuverable with the T-nut body 1. The storage cavity 9 conforms to the wing nut 13 as the storage cavity 9 may comprise a nut-receiving portion 10 and at least one wing-receiving portion 11. The nut-receiving portion 10 encases the nut member 14, and the at least one wing-receiving portion 11 encases the at least one wing member 15. In order for the wing nut 13 to be positioned within the cavitated base 2, the storage cavity 9 is integrated into the cavitated base 2. The structural integrity of the T-nut body 1 is preserved as the nut-receiving portion 10 is centrally positioned within the cavitated base 2. The at least one wing-receiving portion 11 is positioned adjacent with the nut-receiving portion 10, thereby conforming to the overall structure of the wing nut 13. The wing nut 13 is able to engage with the bolt while secured within the T-nut body 1 as the nut member 14 is positioned within the nut-receiving portion 10, and the at least one wing member 15 is positioned within the at least one wing-receiving portion 11.

The connection between the T-nut body 1 and the bolt is further secured as the present invention may further comprise a rubber ring 17, seen in FIG. 2. The rubber ring 17 also eliminates or significantly reduces the oxidation of the bolt. In order to secure the position of the rubber ring 17 with the T-nut body 1, the T-nut body 1 may further comprise a ring-receiving recess 12. The ring-receiving recess 12 readily receives the rubber ring 17 and frictionally engages with the rubber ring 17 in order to hold the rubber ring 17 in place. As the proximal planar surface 3 presses against the base of a toilet bowl, and consequently the toilet bowl flange, the ring-receiving recess 12 traverses from the proximal planar face into the cavitated body. The ring-receiving recess 12 is concentrically positioned with the first threaded hole 8, thereby evenly positioning the rubber ring 17 around the bolt of the toilet bowl flange. In order to further fasten the connection between the T-nut body 1 and the bolt, the rubber ring 17 is pressed into the ring-receiving recess 12.

In the preferred embodiment of the present invention, the handle 5 may comprise a first round end 6 and a second round end 7, seen in FIG. 1 and FIG. 2. The first round end 6 and the second round end 7 provide an ergonomic structure for the handle 5 so that a user may easily rotate the T-nut body 1, and consequently the wing nut 13, until the bolt is fully tightened. The handle 5 is positioned across the distal planar surface 4 as the distal planar surface 4 is oriented towards the surrounding environment. Moreover, the first round end 6 is positioned opposite the second round end 7 along the handle 5.

Although the invention has been explained in relation to its preferred embodiment, it is to be understood that many other possible modifications and variations can be made without departing from the spirit and scope of the invention as hereinafter claimed.

What is claimed is:

1. A T-nut for a toilet bowl flange bolt comprising:
   a T-nut body;
   a wing nut;
   a rubber ring;
   the T-nut body comprising a cavitated base, a handle, a first threaded hole, and a ring-receiving recess;
   the wing nut comprising a nut member, at least one wing member, and a second threaded hole;
   the cavitated base comprising a proximal planar surface and a distal planar surface;
   the proximal planar surface being positioned opposite the distal planar surface about the cavitated base;
   the handle being positioned adjacent with the distal planar surface;
   the handle being fixed onto the distal planar surface;
   the at least one wing member being laterally fixed with the nut member;
   the second threaded hole traversing through the nut member;
   the wing nut being mounted within the cavitated base;
   the first threaded hole traversing from the proximal planar surface into the cavitated base;
   the second threaded hole being concentrically positioned with the first threaded hole;
   the ring-receiving recess traversing from the proximal planar face into the cavitated base;
   the ring-receiving recess being concentrically positioned with the first threaded hole; and,
   the rubber ring being pressed into the ring-receiving recess.

2. The T-nut for a toilet bowl flange bolt as claimed in claim 1 comprising:
   the first threaded hole further traversing through the cavitated base and into the handle.

3. The T-nut for a toilet bowl flange bolt as claimed in claim 1 comprising:
   the T-nut body further comprising a storage cavity;
   the storage cavity comprising a nut-receiving portion and at least one wing-receiving portion;
   the storage cavity being integrated into the cavitated base;
   the nut-receiving portion being centrally positioned within the cavitated base;
   the at least one wing-receiving portion being positioned adjacent with the nut-receiving portion;
   the nut member being positioned within the nut-receiving portion; and,
   the at least one wing member being positioned within the at least one wing-receiving portion.

4. The T-nut for a toilet bowl flange bolt as claimed in claim 1, wherein a transversal cross section of the nut member is a hexagonal shape.

5. The T-nut for a toilet bowl flange bolt as claimed in claim 1, wherein the at least one wing member is three wing members.

6. The T-nut for a toilet bowl flange bolt as claimed in claim 1, wherein the at least one wing member is shaped as a rectangular prism.

7. The T-nut for a toilet bowl flange bolt as claimed in claim 1 comprising:
   the handle comprising a first round end and a second round end;
   the handle being positioned across the distal planar surface; and,
   the first round end being positioned opposite the second round end along the handle.

8. The T-nut for a toilet bowl flange bolt as claimed in claim 1, wherein the T-nut body is made of a plastic material.

9. The T-nut for a toilet bowl flange bolt as claimed in claim 1, wherein the wing nut is made of a plastic material.

* * * * *